United States Patent [19]

Hiroi

[11] Patent Number: 5,029,066
[45] Date of Patent: Jul. 2, 1991

[54] PROCESS CONTROL SYSTEM

[75] Inventor: Kazuo Hiroi, Tokyo, Japan

[73] Assignee: Kabushiki Kaisha Toshiba, Kanagawa, Japan

[21] Appl. No.: 324,771

[22] Filed: Mar. 17, 1989

[30] Foreign Application Priority Data

Mar. 18, 1988 [JP] Japan .................................. 63-66523

[51] Int. Cl.⁵ ........................ G05B 13/02; G05B 11/01
[52] U.S. Cl. ...................................... 364/162; 364/176
[58] Field of Search ........................ 364/148, 160-165, 364/176, 177, 553; 318/561, 609, 610, 615

[56] References Cited

U.S. PATENT DOCUMENTS

| | | | |
|---|---|---|---|
| 3,644,719 | 2/1972 | Rouxel et al. | 364/161 |
| 4,052,642 | 10/1977 | Speth et al. | 364/165 |
| 4,139,887 | 2/1979 | Levesque, Jr. | 364/175 |
| 4,500,950 | 2/1985 | Putman | 364/176 |
| 4,563,735 | 1/1986 | Hiroi et al. | 364/165 |
| 4,679,136 | 7/1987 | Shigemasa | 364/162 |
| 4,755,924 | 7/1988 | Hiroi . | |
| 4,882,526 | 11/1989 | Iino et al. | 364/162 |

FOREIGN PATENT DOCUMENTS 61-198302 9/1986 Japan .
61-290505 12/1986 Japan .

Primary Examiner—Jerry Smith
Assistant Examiner—Jim Trammell
Attorney, Agent, or Firm—Finnegan, Henderson, Farabow, Garrett, and Dunner

[57] ABSTRACT

A system for controlling a process system subject to an external disturbance by adjusting a value of a control amount outputted by the process system to a given target value. The system includes a difference computing unit for computing a difference between the control amount value and the given target value, a main control unit for performing at least proportional and integral control operations from a choice of proportional, integral and differential control operations based on control constants including proportional gain, integration time, and derivation time adjusted to a first given state that suppresses fluctuation of the control amount produced by external disturbance, and a compensation control unit for performing a compensation control operation to equivalently adjust the control constants of the main control unit to second given state that tracks target value variation.

8 Claims, 6 Drawing Sheets

FIG. 2

| VARIATION | ADJUSTMENT MODE | $K_P$ PROPORTIONAL GAIN | $T_I$ INTEGRATION TIME | $T_D$ DIFFERENTIATION TIME |
|---|---|---|---|---|
| TARGET VALUE | PI | $0.35T/KL$ | $1.2T$ | — |
| EXTERNAL DISTURBANCE | PI | $0.6T/KL$ | $4L$ | — |
| | PID | $0.95T/KL$ | $2.4L$ | $0.4L$ |

FIG. 3

| 2 DEGREE OF FREEDOM PID CONTROL MODE | TARGET VALUE CONTROL MODE | EXTERNAL DISTURBANCE CONTROL MODE | COEFFICIENT $\alpha$ |
|---|---|---|---|
| PI-PI CONTROL | PI | PI | $\alpha_1 = 0.58$ |
| PI-PID CONTROL | PI | PID | $\alpha_2 = 0.37$ |

PROCESS CONTROL SYSTEM

FIELD OF THE INVENTION

This invention relates to a process control system, and more particularly to a system capable of executing proportional integral, and differential control.

BACKGROUND OF THE INVENTION

Conventionally, the proportional (P), integral (I), and differential (D) control algorithm forming the basis of this type of process control device was a so-called PID control algorithm of one degree of freedom, in which only one of the various control constants (proportional gain, integration time, or derivation time) could be set. Thus, the response characteristic produced by this process control device is set by the condition of adjustment of the various control constants, and, in ordinary process control, when the control object is subjected to an external disturbance, the various control constants are adjusted to suppress the effect of the disturbance rapidly.

However, when the control constants are set in the condition for optimal external disturbance suppression, if the target value is altered, the control amount will overshoot the change in the target value. Also, if the control amount follows the variation of the target amount in an optimal manner, i.e., the control constants are set in an optimum target value tracking characteristic condition, the suppression characteristic with respect to external disturbance is extremely gradual, with the result that the response takes a long time.

Recent attention has been given to this situation. For example, U.S. Pat. No. 4,755,924 of the present applicants describes a two degree of freedom PID control algorithm wherein the control constants can be respectively independently adjusted to the optimum characteristic state in respect of both target value tracking and suppression of external disturbance. By applying this to the entire control system of a plant, the control characteristics can be greatly improved. The most basic element of the algorithm is a target value filter. FIG. 1 is a block diagram showing a conventional process control device having two degrees of freedom of only proportional (P) operation.

The conventional process control device of FIG. 1 includes a difference computing part 10, a main control part 11 of the differential precursor type, a process system 12 as the control object, and compensation control part 13. Difference computing part 10 computes the difference $\epsilon$ ($=SV'-PV$) between the correction target value SV' obtained through compensation control part 1 of that target value SV, and the control amount PV that is fed back from control object 13. The main control part 11 performs proportional, integral, and differential computations on this difference $\epsilon$ based on control constants (proportional gain KP, integration time $T_I$, and derivation time $T_D$) adjusted to a characteristic condition such as to optimally suppress fluctuation produced by external disturbance D of control amount PV, and computes adjustment output MV such that control amount PV coincides with target value SV, and outputs this to control object 12. Specifically, main control part 11 consists of proportional +integral computing part 21 $(1+(1/T_I \cdot S))$; subtracting part 22; incomplete derivation computing part 23 $(T_D \cdot S)/(1+\eta \cdot T_D \cdot S)$; and proportional gain part 24 (Kp). The difference $\epsilon$ between control amount PV and target value SV' is fed to proportional +integral computing part 21, and the result of the proportional +integral computation is input to subtracting part 22. Also, control amount PV is fed to incomplete derivation computing part 23, and the result of the incomplete derivation computation is input to subtracting part 22. The result of subtracting these is input to proportional gain part 24, where it is multiplied by proportional gain Kp, and output to control object 12 as the computed adjustment output MV. Control object 12 executes an appropriate control operation with this computed adjustment output MV as its operating amount.

When an external disturbance D is applied and produces a disturbance in control, a fluctuation of control amount PV is detected. Additionally, compensation computing part 13 consists of advance/delay element $1+\alpha \cdot T_I \cdot S)/(1+T_I \cdot S)$. This aims at giving two degrees of freedom only to proportional (P) operation by effectively revising the proportional gain of main control part 11 to a characteristic condition in which it optimally tracks the variation in target value SV and outputs the revised target value SV'.

In FIG. 1, the transfer function CD(S) of the control algorithm with respect to the change in the external disturbance is:

$$C_D(S) = MV/PV = Kp[(1-(1/T_I \cdot S) + (T_D \cdot S)/(1+\eta \cdot T_D \cdot S)] \quad (1)$$

and the transfer function CS(S) of the control algorithm with respect to the variation of the target value is:

$$C_S(S) = MV/SV = ((1+\alpha \cdot T_I \cdot S)/(1+T_I \cdot S)) \cdot Kp \\ (1+1/(T_I \cdot S)) = Kp(1+1)/(T_I \cdot S) \quad (2)$$

where $K_p$, $T_I$, and $T_D$ are the control constants of the transfer function, respectively indicating the proportional gain, integration time, and derivation time. S is a complex variable (Laplace operator), and $\eta$ is a constant of about 0.1 to 0.3. The variable $\alpha$ is the proportional gain revision coefficient for revising the optimum proportional gain $K_p$ for external disturbance suppression to optimal proportional gain $K_p^*$ ($=\alpha \cdot K_p$) for target value tracking.

Consequently, from equation (1) and equation (2) above, if this proportional gain revision coefficient $\alpha$ is altered by inserting a compensation control part 13 consisting of advance/delay element $(1+\alpha \cdot T_I \cdot S)/(1+T_I \cdot S)$ on the input line of target value SV as shown in FIG. 1, with the proportional gain of the control algorithm for external disturbance variation as shown in equation (1) still left at $K_p$, the proportional gain of the control algorithm for a change of target value as shown in equation (2) becomes $\alpha \cdot K_p$. Thus, by setting $\alpha$, the proportional gain $K_p$ can be independently adjusted to an optimum characteristic condition for both target value tracking and external disturbance suppression. That is, there are two degrees of freedom for proportional (P) operation only.

However, in industrial applications, if only proportional (P) operation has two degrees of freedom, optimizing the aforementioned proportional gain revision coefficient $\alpha$ in each case is impractical when several hundred to several thousand loops are in question, because, strictly speaking, there is an appreciable amount of variation of the characteristic of the control object 12, i.e., this characteristic varies somewhat with the gain, time constant and idle time of the control object 12. Consequently, $\alpha$ is fixed in the neighborhood of the optimum value using the C.H.R. (Chien, Hrones, Reswich) method. However, by fixing this proportional gain revision coefficient $\alpha$, the benefit of providing two degrees of freedom in the setting of the control constants of the proportional integral, differential control (i.e. the benefit in terms of improved controllability of simultaneously realizing the characteristics of both external disturbance suppression and target value tracking) is halved in the application to an actual plant.

Thus, with a conventional process control device, there is the problem that the benefit of improving the controllability could not be adequately exhibited by simultaneous realization of both the external disturbance suppression characteristic and target value tracking characteristic.

SUMMARY OF THE INVENTION

It is an object of this invention to improve the controllability of a process control system.

Another object of the invention is to make it possible to control simultaneously the external disturbance suppression characteristic and target value tracking.

The foregoing objects are achieved according to the invention by providing a system for controlling a process system subject to an external disturbance by adjusting a value of control amount output by the process system to a given target value. The system comprises difference computing means for computing a difference between the control amount value and the given target value; main control means for performing at least proportional and integral control operations out of proportional, integral and differential control operations based on control constants (proportional gain, integration time, derivation time) adjusted to a first given state that suppresses fluctuation of the control amount produced by external disturbance, and compensation control means for performing a compensation control operation by a given revision coefficient to equivalently adjust the control constants of the main control means to a second given state that tracks target value variation.

According to another aspect of the present invention, the above objects are achieved by providing a method of controlling a process system subject to an external disturbance by adjusting a value of control amount output by the process system to a given target value comprising the steps of computing a difference between the control amount value and the given target value, performing at least proportional and integral control operations out of proportional, integral and differential control operations based on control constants (proportional gain, integration time, derivation time) adjusted to a first given state that suppresses fluctuation of the control amount produced by external disturbance, and performing a compensation control operation by a given revision coefficient to equivalently adjust the control constants to a second given state that tracks target value variation.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of the present invention and many of its advantages will be readily obtained by reference to the following detailed description considered in connection with the accompanying drawings, in which:

FIG. 2 and FIG. 3 are views explaining the conceptual principle of this invention;

DESCRIPTION OF THE PREFERRED EMBODIMENTS

Figure 1:
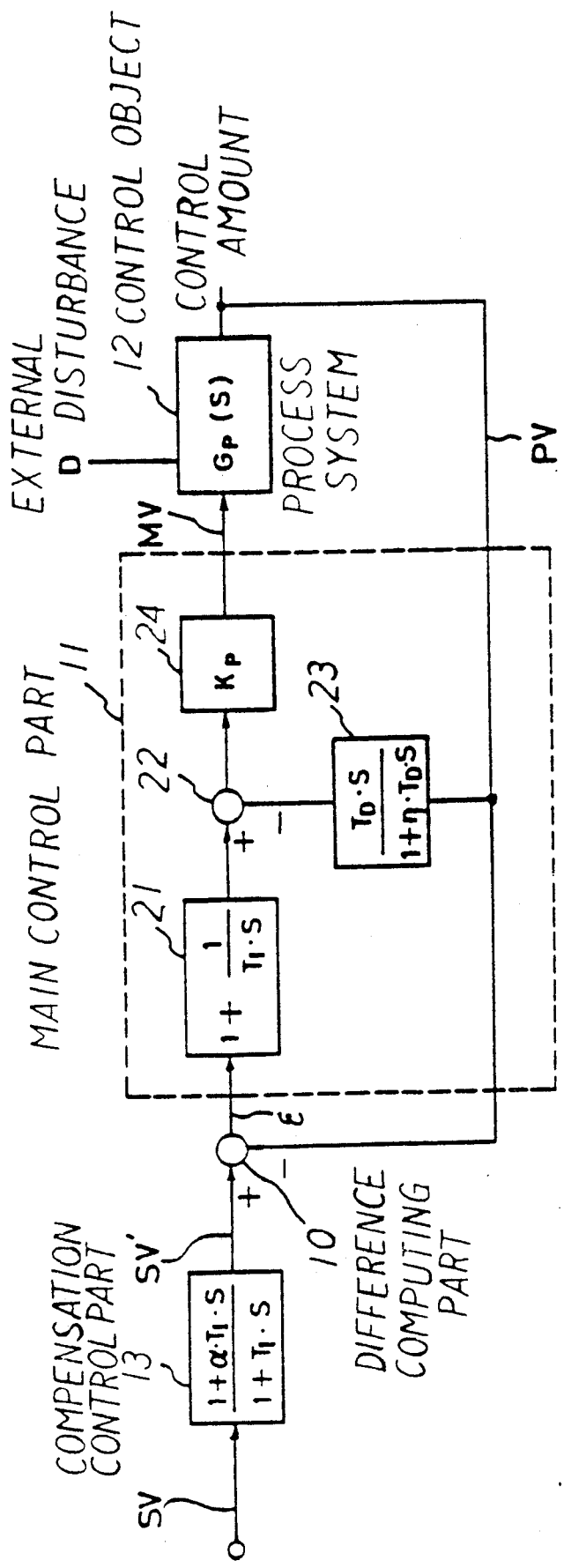
FIG. 1 is a diagram showing a conventional process control system.

In the CHR method, if the control object characteristic is equation (3), $G_p(S) = K \times E^{-LS}/(1+T \cdot S) \ldots$ (3) the optimum control constants (proportional gain $K_p$, integration time $T_I$, derivation time $T_D$) are as shown in FIG. 2. FIG. 2 is a case where the response characteristic is "no overshoot, minimum setting time."

In the aforementioned equations (1) and (2), if $K_p$ is the optimum proportional gain for external disturbance suppression and $K_p^*$ is the optimum proportional gain for target value tracking, $$K_p^* = \alpha \cdot K_p,$$

so $$\alpha = K_p^*/K_p \tag{4}$$

Thus, $\alpha$ is equal to the optimum proportional gain for target value tracking/optimum proportional gain for external disturbance suppression.

Next, from equation (4) and FIG. 2, if we find the proportional gain revision coefficient $\alpha$ for the two degree of freedom proportional/integral/differential control mode, the situation is as shown in FIG. 3. Specifically, the proportional gain revision coefficient $\alpha 1$ in the case of proportional/integral (PI) - proportional/integral (PI) control is:

$$\alpha 1 = Kp^*/Kp = 0.35T/KL/0.6T/KL = 0.58 \tag{5}$$

and the proportional gain revision coefficient $\alpha 2$ in the case of proportional/integral (PI) - proportional/integral/differential (PID) control is:

$$\alpha 2 = Kp^*/Kp = 0.35T/KL/0.95T/KL = 0.37 \tag{6}$$

That is, the value of the proportional gain revision coefficient $\alpha$ of two degrees of freedom proportional/integral/differential control is clearly different depending on whether the control constant (derivation time $T_D$) of the derivation computation is zero or non-zero.

From the above, a two degree of freedom proportional/integral/differential control process control device of universal type can be realized that is capable of application to the control of all control objects such as flow amount, pressure, level, temperature and constituents, by revising the value of the proportional gain revision coefficient $\alpha$ of the compensation computation part for two degree of freedom proportional/integral/differential control in accordance with whether the control constant (derivation time $T_D$) of the derivation computation is zero or nonzero.

Specifically, in general the two degree of freedom proportional/integral/differential control suited to each control object is applied to:

proportional integral — proportional integral control . . .

flow amount, pressure control .

proportional integral — proportional integral differential control . . .

temperature, level, constituent control.

However, with the two degree of freedom proportional integral differential control of this invention, the number of control constants that require tuning is exactly the same as in the case of one degree of freedom proportional integral differential control, and an optimum control characteristic for all control objects can be realized with the same sensitivity.

An embodiment of this invention based on the above concept is described below with reference to the drawings.

Figure 4:
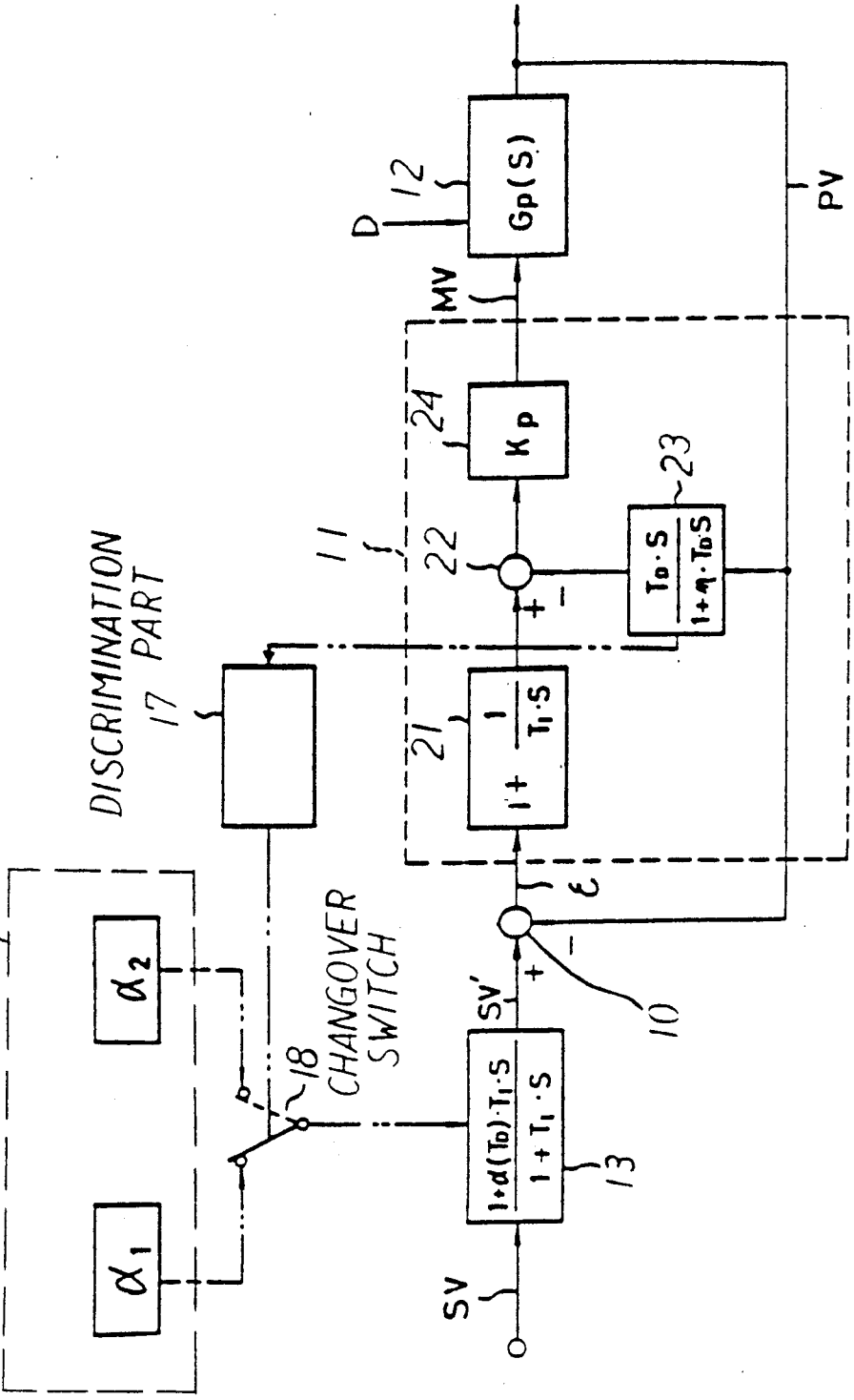
FIG. 4 is a block diagram showing a process control system according to this invention.

FIG. 4 is a functional block diagram showing an example of the layout of a process control device according to this invention. Parts that are the same as in FIG. 1 are given the same reference numerals and a description is omitted; only the different parts will be described here.

Specifically, in FIG. 4, in addition to FIG. 1, there are provided parameter setting part 15, a discrimination part 17, and a changeover switch part 18. In parameter setting part 15, proportional gain revision $\alpha 1$ (=0.58) is set, and also likewise proportional gain revision coefficient $\alpha 2$ (=0.37) is set. The derivation time $T_D$ set in incomplete derivation computation part 23 is fed to discrimination part 17, which delivers a discrimination output after performing a discrimination as to whether this derivation time $T_D$ is 0 or other than 0. In response to the discrimination output from discrimination part 17, changeover switch part 18 sets, by means of its changeover action, the coefficient $e$ ($T_D$) of the advance/delay element $(1+\alpha(T_D)\cdot T_I\cdot S)/(1+T_I\cdot S)$ (constituting compensation computing part 13) to one or other of proportional gain revision coefficient $\alpha 1$ (set in parameter setting part 15) or proportional gain revision coefficient $\alpha 2$ (set in parameter setting part 15).

When the discrimination output from discrimination part 17 is "derivation time $T_D$ is 0", it sets proportional gain revision coefficient $\alpha 1$, and when this output is "derivation time $T_D$ is other than 0", it sets proportional gain revision coefficient $\alpha 2$. In a two degree of freedom proportional integral differential control process control device constructed as above, first of all, in the case where control object 3 is for example a flow amount or a pressure, etc., derivation time $T_D$ set in incomplete derivation computing part 23 of main control part 11 becomes 0. As a result, the two degree of freedom proportional integral differential control mode becomes proportional integral (PI) - proportional integral (PI) control, and changeover switch 18 is changed over to the side shown by the full line in the drawing in response to the discrimination output from discrimination part 17 (that derivation time $T_D$ is 0). Thereby, as the coefficient $\alpha$ ($T_D$) of the advance part of the advance/delay element $(1+\alpha(T_D)\cdot T_I\cdot S)/(1+T_I\cdot S)$, proportional gain revision coefficient $\alpha 1$ (=0.58) of parameter setting part 15 is set as the optimum proportional gain. Thus, in this case, the transfer function CD (S) of the control algorithm for external disturbance variation is:

$$C_S(S) = MV/PV = K_p(1 + 1/(T_I \cdot S)) \qquad (7)$$

while the transfer function $C_S(S)$ of the control algorithm for target value variation is:

$$\begin{aligned} C_S(S) &= MV/SV \\ &= (1 + \alpha 1 \cdot T_I \cdot S)/(1 + T_I \cdot S) \times \\ &\quad K_p (1 + 1/(T_I \cdot S)) \\ &= K_p (\alpha 1 + 1/(T_I \cdot S)) \end{aligned} \qquad (8)$$

In contrast, in the case where control object 12 is for example a temperature level, or constituent, etc., derivation time $T_D$ set in incomplete derivation computing part 23 of main control part 11 will be other than 0. Because of this, the two degree of freedom proportional integral differential control mode becomes a proportional integral (PI) - proportional integral differential (PID) control, and changeover switch part 18 is changed over to the broken line side in the Figure by the discrimination output (derivation time $T_D$ is other than 0) from discriminating part 17. By this means, as the coefficient $\alpha(T_D)$ of the advance portion of the advance/delay element $(1+\alpha(T_D)\cdot T_I\cdot S)/(1+T_I\cdot S)$ constituting compensation control part 13, proportional gain revision coefficient $\alpha 2$ (+0.37) of parameter setting part 15 is set as the optimum proportional gain.

Thus, in this case, the transfer function $C_D(S)$ of the control algorithm for external disturbance fluctuation becomes:

$$C_D(S) = MV/PV = (1 + 1/(T_I \cdot S)) \qquad (9)$$

while the transfer function $C_S(S)$ of the control algorithm for variation of the target value becomes:

$$\begin{aligned} C_S(S) &= MV/SV \\ &= (1 + \alpha 2 \cdot T_I \cdot S)/(1 + T_I \cdot S) \times \\ &\quad K_p (1 + 1/(T_I \cdot S)) \\ &= K_p (\alpha 2 + 1/(T_I \cdot S)) \end{aligned} \qquad (10)$$

With the above-described embodiment, the proportional gain revision coefficient $\alpha(T_D)$ that revises the two degree of freedom parameter, i.e., the optimum proportional gain for external disturbance suppression $K_p$ to optimize proportional gain for target value tracking $K_p^*(=\alpha \cdot K_p)$, is revised by altering the setting to $\alpha 1$ or $\alpha 2$ in response to whether the derivation time $T_D$ of incomplete derivation computing part 23 of the main control part 11 is zero or nonzero, so the following benefits can be obtained.

(a) Regardless of whether the two degree of freedom proportional integral differential control mode is proportional integral (PI) - proportional integral (PI) control or proportional integral (PI) - proportional integral differential (PID) control, the optimum control characteristic can always be obtained, since both the external disturbance suppression characteristic and target value tracking characteristic are realized simultaneously.

(b) Control object 12 can be applied to the control of all control objects, such as flow amount, pressure, temperature, level, or composition, etc., and thus is of universal industrial application.

(c) The number of control constants that must be tuned is the same as in the conventional one degree of freedom proportional integral differential control, and handling also stays the same, so both unification of the tuning method and a great improvement in controllability can be achieved at the same time.

The process control system of this embodiment is a universally applicable ultimate two degree of freedom proportional integral differential process control device that has the above excellent characteristics, improves the basics of the control system, and replaces the conventional one degree of freedom proportional integral differential control or two degree of freedom proportional integral differential control. In the future, advances will be made in flexibility of plant control, and use of superconductors. Due to introduction of changes in production quantity, quality or product type, or optimazation, changes in target values and fluctuations of external disturbance will become increasingly frequent.

To cope with the adoption of these advances, two degree of freedom control is needed. By applying the process control device of this embodiment, in which two degree of freedom control is carried to its ultimate, the plant operating characteristic can be raised to its limit, making a considerable contribution to maximal development in the industrial sphere.

This invention is not restricted to the above embodiment, but can be put into practice as follows.

(a) In the above-described embodiment of FIG. 4, only the proportional (P) operation, that is most fundamental and indispensable to all control systems, was described for a two degree of freedom process control device. However, this invention can be applied likewise to process control devices wherein the proportional +integral (PI) operation is in two degree of freedom form.

Figure 5:
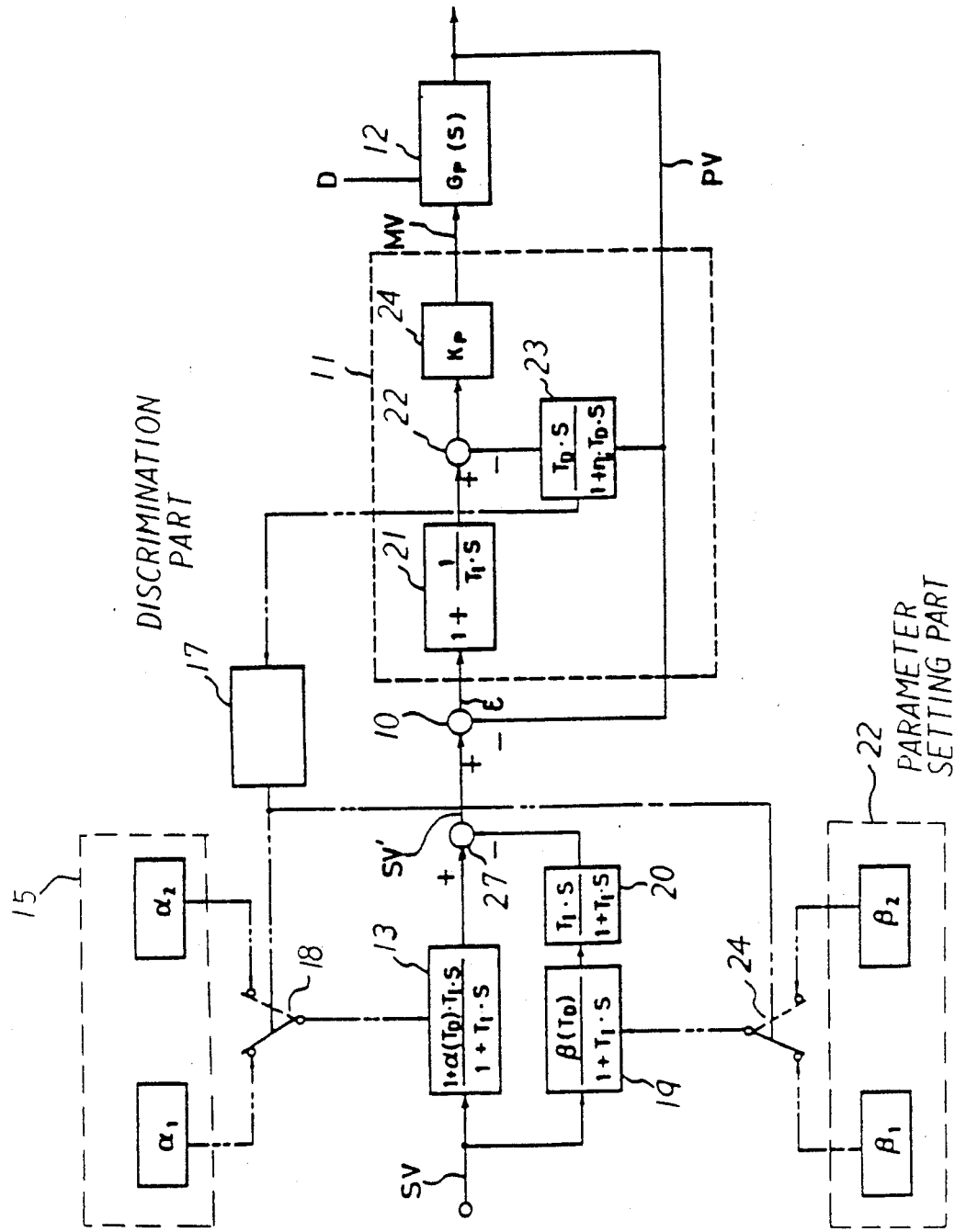
FIG. 5, FIG. 6, and FIG. 7 are block diagrams showing other embodiments of the process control system according to the invention.

FIG. 5 is a function block diagram showing an example of the layout of such a process control device. Parts that are the same as in FIG. 4 are given the same reference numeral, and further description is omitted. Only parts that are different from FIG. 4 will be described here. Specifically, in FIG. 5, in addition to FIG. 4 there are provided compensation computing part 19 consisting of a primary delay element $(\beta(T_D)/(1+T_I \cdot S))$; incomplete derivation computing part 20 $(T_I \cdot S)/(1+T_I \cdot S)$; subtracting part 27 that subtracts the output of compensation computing part 19 and the output of computing part 20; parameter setting part 22 wherein the integration time revision coefficient $\beta 1$ (=0.1) and integration time revision coefficient $\beta 2$ (=0.15) are set; and changeover switch part 24. By its changeover action in response to the discrimination output from the discrimination part 17, changeover switch part 24 sets as coefficient $\beta(T_D)$ of the delay part constituting compensation computing part 19 one or the other of the integration time revision coefficient $\beta 2$ or integration time revision coefficient $\beta 1$, which are set in parameter setting part 22. In other words, if the discrimination output from discrimination part 17 is "derivation time $T_D$ is 0" it sets integration time revision coefficient $\beta 1$, and if this output is "derivation time $T_D$ is other than 0", it sets integration time revision coefficient $\beta 2$.

In this embodiment, in cases where derivation time $T_D$ set in incomplete derivation computing part 23 of main control part 11 is 0, the two degree of freedom proportional integral differential control mode becomes proportional integral (PI) - proportional integral (PI) control. Thus, changeover switch part 18 is changed over to the solid line in the Figure depending on whether the discrimination output S from discriminating part 17 is (derivation time $T_D$ is 0), so that, as coefficient $\alpha(T_D)$ of the advance part of the advance/delay element $(1+\alpha(T_D) \cdot T_I \cdot S)/(1+T_I \cdot S)$ constituting compensation computing part 13, proportional gain revision coefficient $\alpha 1$ (=0.58) of parameter setting part 15 is set as optimum proportional gain. Simultaneously, changeover switch part 24 is changed over to the continuous line in the Figure in response to the discrimination output (derivation time $T_D$ is 0) from discrimination part 17, so coefficient $\beta(T_D)$ of delay part of the primary delay element $(T_I \cdot S)/(1+T_I \cdot S)$ constituting compensation computing part 19 is set so that integration time revision coefficient $\beta 1$ (=0.1) of parameter setting part 22 is set as the optimum integration time.

In contrast, when derivation time $T_D$ set in incomplete derivation computing part 23 of main control part 11 is other than 0, the two degree of freedom proportional integral differential control mode becomes proportional integral (PI) - proportional integral differential (PID) control. Thus, changeover switch 18 is changed over to the broken line side in the drawing by the discrimination output (derivation time $T_D$ is other than 0) from discrimination part 17, and, as coefficient $\alpha(T_D)$ of advance part of advance/delay element $(1+\alpha(T_D) \cdot T_I \cdot S)/(1+T_I \cdot S)$ constituting compensation control part 13, proportional gain revision coefficient $\alpha 2$ of parameter setting part 15 (=0.37) is set as the optimum proportional gain. Also, simultaneously, changeover switch part 24 is changed over to the broken line side in the Figure by the discrimination output (derivation time $T_D$ is other than 0) from discriminating part 17, so that, as coefficient $\beta(T_D)$ of delay part of primary delay element $(T_I \cdot S)/(1+T_I \cdot S)$ constituting compensation computing part 19, integration time revision coefficient $\beta 2$ (=0.15) of parameter setting part 22 is set as the optimum integration time.

With this embodiment, proportional gain revision coefficient $\alpha(T_D)$ that revises external disturbance suppression optimal proportional gain to target value tracking optimal proportional gain, and integration time revision coefficient $\beta(T_D)$ that revises external disturbance suppression optimal integration time to target value tracking optimal integration time are revised by altering their setting to $\alpha 1$, $\beta 1$ or $\alpha 2$, $\beta 2$, depending on whether the derivation time $T_D$ of incomplete derivation computing part 23 of the main control part 11 is 0 or other than 0, so the benefits compared with the embodiment of FIG. 4 are even greater.

(b) In the above-described FIG. 4 embodiment, the proportional gain revision coefficient $\alpha(T_D)$ of the compensation control part 13 was revised by altering its setting to X1 or X2 depending on whether the derivation time $T_D$ of incomplete derivation computing part 23 of main control part 11 is 0 or other than 0. However, the invention is not restricted to this and, as shown in the same reference numerals, a construction could be adopted wherein compensation computing parts 41 and 42 including advance/delay elements $(1+\cdot T_I S)/(1+T_I \cdot S)$ and $(1+\alpha 2 \cdot T_I \cdot S)/(1+T_I \cdot S)$ are provided, and one or the other is selected for output by changeover switch part 25, depending on the discrimination output from the discrimination part 17, based on the presence or absence of the derivation time $T_D$.

Figure 6:
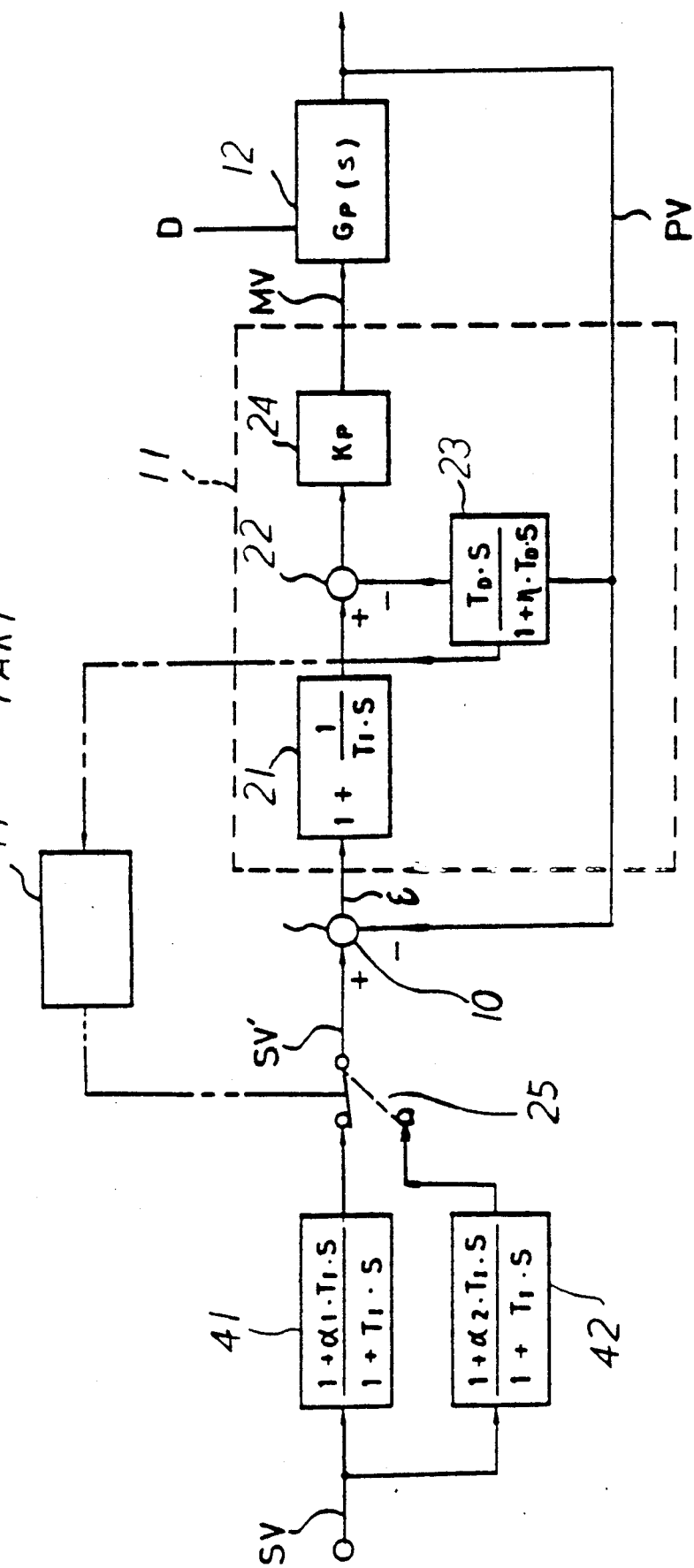
Figure 7:
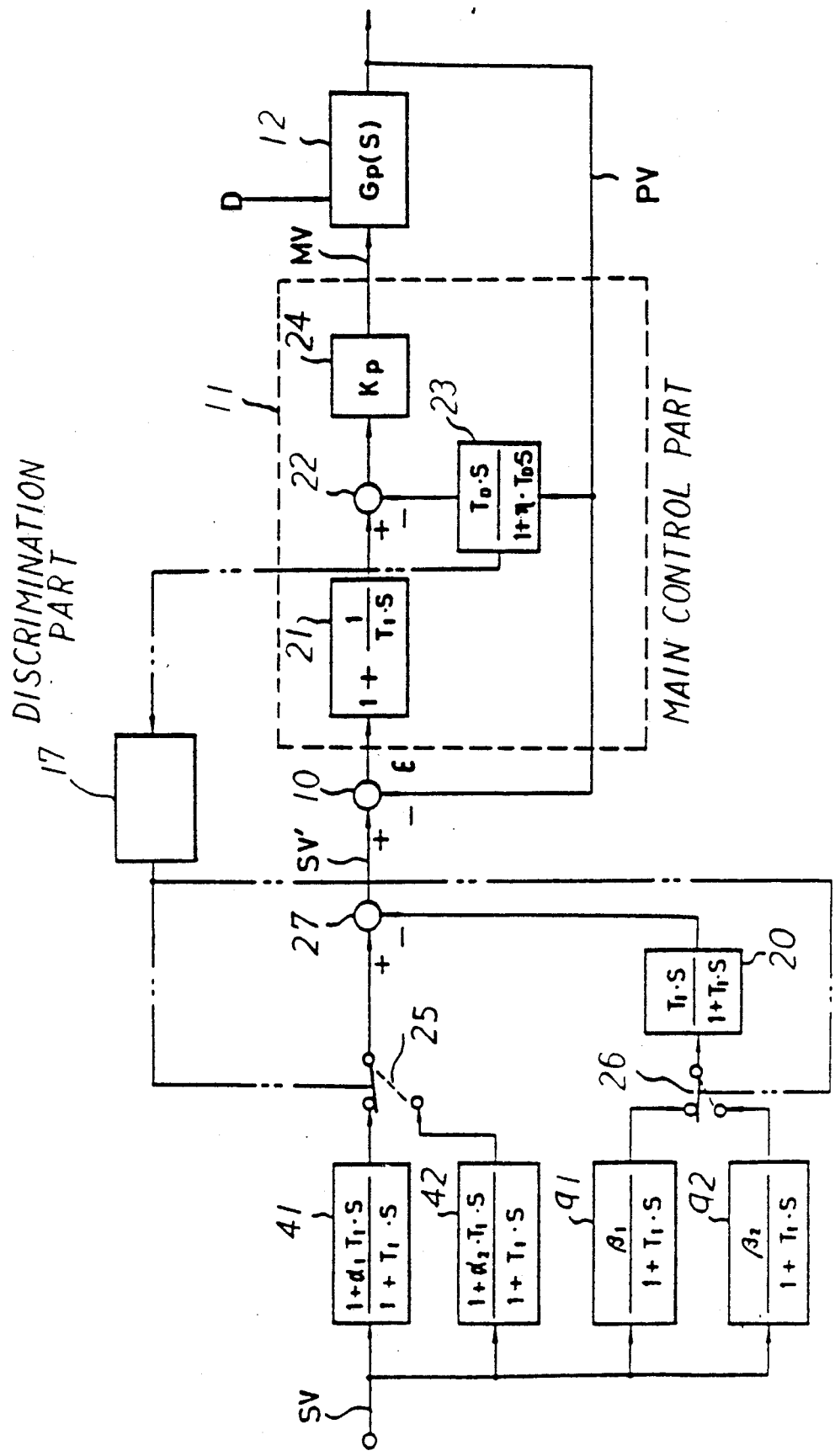

(c) In the above described embodiment of FIG. 5, proportional gain revision coefficient $\alpha(T_D)$ and integration time revision coefficient $\beta(T_D)$ of the compensation control part 13 are revised by changing their setting to $\alpha 1$ and $\beta 1$ or $\alpha 2$ and $\beta 2$ in response to whether the derivation time $T_D$ of incomplete derivation computing part 23 of main control part 11 is 0 or other than 0. However, the invention is not limited to this and, as shown in FIG. 7, wherein parts that are the same as in FIG. 5 and FIG. 6 are given the same reference numerals, a construction could be adopted wherein compensation computing parts 41 and 42 including advance/delay elements $(1+\alpha 1 \cdot T_I \cdot S)/(1+T_I \cdot S)$ and $(1+\alpha 2 \cdot T_I \cdot S)/(1+T_I \cdot S)$, and compensation computing parts 91 and 92 including primary delay elements $(\beta 1/(1+T_I \cdot S)$ and $(\beta 2)/(1+T_I \cdot S)$ are provided, so that one or the other is respectively selected and output by changeover switch parts 25 and 26 depending on the discrimination output from discrimination part 17, based on the presence or absence of derivation time $T_D$.

(d) In all of the above embodiments, in the case of response characteristic "minimum setting time without overshoot," proportional gain revision coefficient $\alpha 1 \times 0.58$ and $\alpha 2 \times 0.37$ are taken. However, the invention is not restricted to this, and for example, in the case of response characteristic "minimum setting time with 20 percent overshoot," proportional gain revision coefficients $\alpha 1 \times 0.86$, $\alpha 2 \times 0.5$ could be taken. That is, the values of the proportional gain revision coefficient as described above will be different depending on the desired response characteristic. However, whatever the case, there is not very much difference between $\alpha 1$ and $\alpha 2$, so this changeover between $\alpha 1$ and $\alpha 2$ is not absolutely essential.

What is claimed is:

1. A system for controlling a process system subject to an external disturbance by adjusting a value of a control amount outputted by the process system to a given target value comprising:

difference computing means for computing a difference between the control amount value and the given target value;

main control means for performing at least proportional and integral control operations from a choice of proportional, integral, and differential control operations on the computed difference between the control amount value and the given target value based on control constants including proportional gain, integration time, and derivation time adjusted to a first given state that suppresses fluctuation of the control amount produced by the external disturbance; and compensation control means for performing a compensation control operation according to a given revision coefficient to adjust the control constants of the main control means to a second given state that corresponds to a variation in the given target value, said compensation control means including discrimination means for determining whether a control constant of the differential control operation is zero or non-zero, main compensation control means for performing said compensation control operation in accordance with a given gain revision coefficient to equivalently adjust the control constants of the main control means to second given states that correspond to target value variations, and parameter setting means for setting the given gain revision coefficient in the main compensation control means based on said discrimination means determining whether said control constant of the differential control operation is zero or non-zero.

2. The system of claim 1, wherein said parameter setting means includes means for setting a plurality of given gain revision coefficients, and changeover switch means for selecting one of the plurality of given gain revision coefficients based on said discrimination means determining whether said control constant of the differential control operation is zero or non-zero.

3. The system of claim 1, wherein said compensation control means includes discrimination means for determining whether a control constant of the differential control operation is zero or non-zero, main compensation control means for performing said compensation control operation in accordance with a given gain revision coefficient and a given integration time revision coefficient to equivalently adjust the control constants of the main control means to third given states that correspond to target value variations, and parameter setting means for setting the given gain revision coefficient and the given integration time revision coefficient in said main compensation control means based on said discriminating means determining whether said control constant of the differential control operation is zero or non-zero.

4. The system of claim 3, wherein said parameter setting means includes means for setting a plurality of given gain revision coefficients and a plurality of given integration time coefficients, and changeover switch means for selecting one of the plurality of given gain revision coefficients and one of the plurality of given gain revision coefficients based on said discriminating means determining whether said control constant of the differential control operation is zero or non-zero.

5. A method of controlling a process system subject to an external disturbance by adjusting a value of a control amount outputted by the process system to a given target value comprising the steps of:

computing a difference between the control amount value and the given target value;

performing at least proportional and integral control operations from a choice of proportional, integral, and differential control operations on the computed difference between the control amount value and the given target value based on control constants including proportional gain, integration time, and derivation time adjusted to a first given state that suppresses fluctuation of the control amount produced by the external disturbance; and performing a compensation control operation according to adjust the control constants to a second given state that corresponds to a variation in the given target value, the step of performing the compensation control operation including the step of determining whether a control constant of the differential control operation is zero or non-zero and the step of performing the compensation control operation to adjust the control constants to a second given state that corresponds to the target value variations including the step of setting the given gain revision coefficient based on whether the control constant of the differential control operation is determined to be zero or non-zero.

6. The method of claim 5, wherein the step of setting includes the substeps of setting a plurality of given gain revision coefficients and selecting one of the plurality of given gain revision coefficients based on whether the control constant of the differential control operation is determined to be zero or non-zero.

7. The method of claim 5, wherein the step of performing the compensation control operation includes the step of determining whether a control constant of the differential control operation is zero or non-zero and, the step of performing the compensation control operation includes selecting a given gain revision coefficient and a given integration time revision coefficient to adjust the control constants to third given state that corresponds to the target value variation and setting the given gain revision coefficient and the given integration time revision coefficient based on whether the control constant of the differential control operation is determined to be zero or non-zero.

8. The method of claim 7, wherein the step of setting includes the substeps of setting a plurality of given gain revision coefficients and a plurality of given integration time coefficients, and selecting one of the plurality of given gain revision coefficients and one of the plurality of given gain revision coefficients based on whether the control constant of the differential control operation is determined to be zero or non-zero.

* * * * *